US012123342B2

(12) United States Patent
Kopp et al.

(10) Patent No.: US 12,123,342 B2
(45) Date of Patent: Oct. 22, 2024

(54) METHOD FOR A COMBUSTION MACHINE WITH TWO TIMES THREE STROKES

(71) Applicants: Dr. Ing. h. c. F. Porsche AG, Stuttgart (DE); Technical University of Cluj-Napoca, Cluj-Napoca (RO)

(72) Inventors: Andre Kopp, Neckarsulm (DE); Ovidiu Barac-Zbircea, Sebis (RO); Nicolae Vlad Burnete, Cluj-Napoca (RO)

(73) Assignees: Dr. Ing. h. c. F. Porsche AG, Stuttgart (DE); Technical University of Cluj-Napoca, Cluj-Napoca (RO)

(*) Notice: Subject to any disclaimer, the term of this patent is extended or adjusted under 35 U.S.C. 154(b) by 0 days.

(21) Appl. No.: 18/585,308

(22) Filed: Feb. 23, 2024

(65) Prior Publication Data

US 2024/0301817 A1 Sep. 12, 2024

(30) Foreign Application Priority Data

Feb. 23, 2023 (DE) ..................... 10 2023 104 487.7

(51) Int. Cl.
*F02B 75/02* (2006.01)
*F02B 29/00* (2006.01)

(52) U.S. Cl.
CPC .............. *F02B 75/02* (2013.01); *F02B 29/00* (2013.01); *F02B 2075/026* (2013.01)

(58) Field of Classification Search
CPC ................................. F02B 75/02; F02B 29/00
See application file for complete search history.

(56) References Cited

U.S. PATENT DOCUMENTS

| | | | | |
|---|---|---|---|---|
| 8,215,268 B2 | 7/2012 | Barberato | | |
| 2012/0166066 A1* | 6/2012 | Fiveland | F02B 75/021 | 701/104 |
| 2014/0020660 A1* | 1/2014 | Lee | F02B 75/045 | 123/48 B |

(Continued)

FOREIGN PATENT DOCUMENTS

| | | |
|---|---|---|
| CH | 714 074 A2 | 2/2019 |
| CN | 112953110 | 6/2021 |

(Continued)

*Primary Examiner* — Kevin A Lathers
(74) *Attorney, Agent, or Firm* — Gerald E. Hespos; Michael J Porco

(57) ABSTRACT

A method for a combustion engine has a working cycle of three revolutions of the crankshaft. The method includes: feeding a fuel mixture into a combustion chamber of a cylinder while moving a piston from a second top dead-center to a first bottom dead-center; compressing an air-fuel mixture in the combustion chamber while moving the piston from the first bottom dead-center to a first top dead-center; burning the air-fuel mixture while moving the piston from the first top dead-center to a second bottom dead-center; compressing a gas mixture in the combustion chamber while moving the piston from the second bottom dead-center to the first top dead-center; burning the gas mixture while moving the piston from the first top dead-center to the first bottom dead-center; and expelling the gas mixture from the combustion chamber while moving the piston from the first bottom dead-center to the second top dead-center.

10 Claims, 5 Drawing Sheets

(56) References Cited

U.S. PATENT DOCUMENTS

| | | | | |
|---|---|---|---|---|
| 2014/0157758 | A1* | 6/2014 | Silver | F01N 3/103<br>60/274 |
| 2017/0159560 | A1* | 6/2017 | Fluhler | F01B 9/042 |
| 2017/0321615 | A1* | 11/2017 | Miller | F02D 41/1406 |

FOREIGN PATENT DOCUMENTS

| | | |
|---|---|---|
| WO | 9848158 | 10/1998 |
| WO | 2022087759 | 5/2022 |

* cited by examiner

METHOD FOR A COMBUSTION MACHINE WITH TWO TIMES THREE STROKES

CROSS-REFERENCE TO RELATED APPLICATION

This application claims priority on German Patent Application No 10 2023 104 487.7 filed Feb. 23, 2023, the entire disclosure of which is incorporated herein by reference.

BACKGROUND

Field of the Invention. The invention relates to a method for a combustion machine (engine) having two alternating sequences of strokes, each consisting of three different strokes, and a cylinder arrangement for carrying out the method of the invention.

Related Art. There is a constant effort to optimize the operation of combustion machines in view of continuously increasing requirements to improve energy efficiency and other operational aspects of combustion machines modern combustion machines.

Prior art combustion machines essentially have had two different types of working cycle options that respectively require combustion machines or cylinder arrangements of different construction. Working cycles are divided into strokes, and a stroke is defined by the movement of the piston during one half revolution of the crankshaft. Thus, two strokes are required for one complete revolution of the crankshaft. The term two-stroke engine is used if the strokes are repeated after just one revolution. Combustion machines in which the cycle is repeated after two revolutions are referred to as four-stroke engines. Thus, a two-stroke engine completes a cycle after just one revolution, while a four-stroke engine completes a cycle after two revolutions.

A combustion chamber is formed by a cylinder and a piston that moves in translation in the combustion chamber. In the case of two-stroke engines, a gas mixture is first of all let into the combustion chamber in a first stroke, and is compressed there by a movement of the piston from the bottom dead center to the top dead center. The bottom dead center is defined as the position of the piston in which the combustion chamber has the maximum volume. Correspondingly, the top dead center is defined as the position of the piston in which the combustion chamber has the minimum volume. The inflowing gas mixture can be a fuel-air mixture or just fresh air. Fuel is injected into the combustion chamber around the top dead center of the piston motion, if the fuel is not already contained in the induced gas mixture, and the gas mixture is ignited. In the context of this application, the term “gas mixture” does not refer exclusively to an air-fuel mixture but merely to a gas of any composition. Thus, for example, air-fuel mixture that has already been burned can be referred to as a gas mixture just as much as air alone. A spark plug brings about ignition in spark-ignition engines. Ignition causes the gas mixture to burn and causes a sharp rise in the pressure in the combustion chamber. Ignition is brought about in diesel engines by the high temperature in the region of maximum compression and the introduction of a self-igniting fuel.

Ignition accelerates the piston in the direction of the bottom dead center in a second stroke, and a power output to the crankshaft takes place via a connecting rod. When the piston reaches and exposes an outlet on its travel toward the bottom dead center, and the ignited or burned gas mixture escapes via this outlet, thereby causing the pressure in the combustion chamber to fall. On the way to the bottom dead center, the piston likewise exposes an inlet, via which fresh air enters the combustion chamber and forces the burned gas mixture fully or partially out of the outlet. This process is referred to as scavenging. By virtue of the residual momentum of the power output, the piston subsequently moves back in the direction of the top dead center, and the working cycle of the two-stroke engine is thereby completed, and the first stroke begins again.

The advantage of the two-stroke engine is that there is a power output in each revolution of the crankshaft, and thus a high power can be accessed. However, there are disadvantages of high wear, high fuel consumption, high emissions and relatively low durability of the components due to high thermal and mechanical stresses.

Four-stroke engines eliminate these disadvantages and are used commonly on motor vehicles. The first stroke of a four-stroke engine is characterized by the induction of a gas mixture (either fresh air with subsequent injection of fuel or an air-fuel mixture) through an inlet valve. This induction of the gas mixture takes place during the movement of the piston from the top dead center to the bottom dead center. The inlet valve is closed once the maximum combustion chamber volume has been achieved and the piston is at its point of reversal (the bottom dead center). The gas mixture enclosed in the combustion chamber is compressed in the second stroke as the piston moves from the bottom to top dead center. The gas mixture is ignited in the region of the top dead center, i.e. in the region of maximum compression. This ignition results in an excess pressure in the combustion chamber and accelerates the piston toward the bottom dead center and thus outputs power to the crankshaft (third stroke). In a fourth stroke, the burned gas mixture is expelled from the combustion chamber again via an exhaust valve.

The four-stroke engine enables considerably reduced emissions and fuel consumption in comparison with the two-stroke engine and significantly increases the reliability and durability of the engine. However, the power output is reduced since just one power output takes place in two revolutions of the crankshaft.

The prior art includes other internal combustion engines and methods for operating an internal combustion engine. For example, U.S. Pat. No. 8,215,268 B2 discloses a three-stroke internal combustion engine having two connecting rods that are connected to one another by the crankshaft so as to move toward and away from one another. Here, an exhaust/intake step, a compression step and an expansion step are carried out during one crankshaft rotation. Ports in the cylinders are arranged close to the crankshaft.

CH714074A2 discloses an internal combustion engine featuring a three-stroke method. The method corresponds to a two-stroke method with an additional stroke for scavenging. Here, the time for more thorough scavenging is achieved by a triangular motion at the crank pin. This triangular motion is achieved by a pinion and a rolling-circle annulus in a diameter ratio of 1:3 or 2:3. Thus, the piston is raised and lowered fully once or twice during a 3-times revolution of the crankshaft (1080°).

CN112953110A discloses an electromagnetic three-stroke piston engine having a planetary transmission. WO2022087759A1 discloses a free-piston internal combustion engine having two interconnected pistons for driving a hydraulic motor using a three-stroke principle.

Given the described background, an object of the invention is to provide a novel method for operating an internal combustion engine that combines advantages of the two-stroke and four-stroke methods while minimizing disadvantages of the respective methods. Another object is to provide a cylinder arrangement and an internal combustion engine by means of which the method of the invention can be implemented.

SUMMARY

One aspect of this disclosure relates to method for operating a combustion machine that has a working cycle (overall cycle) of three revolutions of a crankshaft of the combustion machine. During this cycle, the piston of the combustion machine passes through a first top dead center twice and a second top dead center once and passes through a first bottom dead center twice and a second bottom dead center once. The first top dead center and the first bottom dead center are farther from the crankshaft than the second top dead center and the second bottom dead center, respectively. An aspect of the method disclosed herein comprises the following strokes: (A) feeding a fuel mixture into a combustion chamber of the cylinder during the movement of the piston from the second top dead center to the first bottom dead center; (B) compressing the air-fuel mixture in the combustion chamber of the cylinder during the movement of the piston from the first bottom dead center to the first top dead center; (C) burning the air-fuel mixture during the movement of the piston from the first top dead center to the second bottom dead center; (D) compressing a gas mixture located in the combustion chamber at this point in time during the movement of the piston from the second bottom dead center to the first top dead center; (E) burning the gas mixture during the movement of the piston from the first top dead center to the first bottom dead center; and (F) expelling the gas mixture located in the combustion chamber during the movement of the piston from the first bottom dead center to the second top dead center.

In some aspects of this disclosure, at least some of the gas mixture located in the combustion chamber is scavenged from the combustion chamber as the piston passes through the second bottom dead center. Passage through the second bottom dead center means the movement of the piston in one direction to the bottom dead center and a reversed movement into the opposite direction at the bottom dead center.

The scavenging of the combustion chamber during the passage through the second bottom dead center causes the combustion of the air-fuel mixture in method step (C) to take place only until the start of scavenging, which takes place from the crossing over of the first bottom dead center. Similarly, the compression of the gas mixture according to method step (D) also takes place only when the scavenging of the combustion chamber during the passage through the second bottom dead center is complete, and this preferably likewise occurs when the first bottom dead center is crossed over, this time in the opposite direction.

The term "fuel mixture" mentioned in method step (A) refers both to a fuel mixture that is injected or induced through the inlet valve into the combustion chamber of the cylinder as a ready-made fuel-air mixture and also to a fuel-air mixture that is formed by the induction of fresh air and the injection of a fuel only in the combustion chamber. The term "fuel mixture" also can refer to the residual gas located in a burnt or partially burnt form in the combustion chamber after a combustion.

The method disclosed herein has six individual strokes that can be divided into two three-stroke sequences. Both three-stroke sequences have a combustion stroke that provides a power output to the crankshaft. In the context of this application, reference is made to a three-stroke method, even if six strokes are required to form one complete working cycle of the combustion machine with two power strokes. During this process, the camshaft rotates three times more slowly than the crankshaft. The two individual three-stroke processes also are referred to as operating cycles.

At least some of the gas mixture in the combustion chamber is scavenged from the combustion chamber as the piston passes through the second bottom dead center. Thus, the method disclosed herein has all the method steps both of a four-stroke engine and of a two-stroke engine. It is possible to increase the power output in comparison with the four-stroke engine by means of the doubled power output within the six individual strokes. At the same time, the disadvantages of the two-stroke method can be eliminated through the clean and complete combustion of the fuel mixture.

In some embodiments, scavenging of the combustion chamber takes place in the region of the second bottom dead center by means of at least one scavenging port arranged radially in the cylinder. The scavenging port can be dimensioned in accordance with the quantity of gas to be scavenged or can be divided into plural smaller ports to optimize scavenging. A gas mixture enters the combustion chamber through the at least one scavenging port. The gas mixture that previously expanded in the combustion chamber on account of the combustion process may have been discharged from the combustion chamber through an exhaust valve or some other exhaust port. In this context, the scavenging ports also may be used to discharge the gas mixture located in the combustion chamber.

In another embodiment of the invention, a fuel mixture is fed into the combustion chamber during the movement of the piston from the second bottom dead center to the first top dead center. For example, the fuel mixture is injected through the inlet valve or fed through the scavenging ports. In some embodiments, injection takes place during the scavenging of the combustion chamber, shortly after the piston passes through the second bottom dead center, and before the first bottom dead center is reached by the piston. By means of this additional supply of fuel mixture, the gas mixture in the combustion chamber can be prepared in an optimum manner for the second combustion during the second power output, thereby making it possible to ensure an optimum power output and clean combustion.

To implement the method, it is necessary to ensure the movement of the piston between the dead centers. Thus, the method cannot be applied to every combustion machine or every cylinder arrangement. The term "cylinder arrangement" should be understood to mean the arrangement of a cylinder, together with a piston, connecting rod and fastening on a crankshaft. An internal combustion engine as described herein comprises plural cylinder arrangements with a common crankshaft.

The cylinder arrangement for a combustion machine has a piston that is designed to oscillate, move or translate backward and forward in a cylinder and to delimit a combustion chamber within the cylinder. The cylinder arrangement further has a connecting rod that is designed to connect the piston to at least one planet wheel by means of a connecting element. The connecting element is arranged eccentrically on the planet wheel, and the planet wheel is engaged with an annulus and rotates in the planet wheel. The connecting element also is connected to a crankshaft. A connecting element arranged eccentrically on the planet wheel is defined by the fact that the geometrical center of the connecting element does not coincide with the geometrical center of the planet wheel but has an eccentricity. Furthermore, the dimensions of the planet wheel and the eccentric arrangement of the connecting element are designed so that, in three revolutions of the planet wheel or the crankshaft in the annulus, the piston reaches a first top dead center twice and a second top dead center once and reaches a first bottom dead center twice and a second bottom dead center once. The first top dead center and the first bottom dead center are farther from an axis of the crankshaft than the second top dead center and the second bottom dead center, respectively.

To enable the required working cycle of the method, the diameter of the planet wheel of some embodiments is three fifths of the diameter of the annulus. The diameter is taken to mean the pitch diameter of a gearwheel (i.e. the planet wheel or annulus). The speed ratio between the planet wheel and the crankshaft is preferably two to three.

The eccentric fastening of the connecting element on the planet wheel ensures that the geometrical center of the connecting element of the connecting rod with the planet wheel is forced onto a hypocycloidal path, thereby giving the different dead centers. The dimensioning of the eccentricity defines the distances between the dead centers.

The cylinder of one embodiment has at least one scavenging port between the first bottom dead center and the second bottom dead center. The scavenging port is designed to scavenge the combustion chamber when the piston is below the first bottom dead center and thus exposes the scavenging port. In this way, it is possible to provide a simple way of scavenging the combustion chamber. It is possible to have an embodiment in which, via the scavenging ports, both the gas mixture in the combustion chamber is discharged and a fresh gas mixture is introduced and also an embodiment in which only fresh gas mixture is introduced, while the discharge of the gas mixture in the combustion chamber is ensured via another exhaust port or an exhaust valve.

The cylinder arrangement of some embodiments has the connecting element between the connecting rod and the planet wheel formed by an eccentrically arranged cylindrical element that is surrounded by a connecting rod eye arranged at one end of the connecting rod. This arrangement represents an easily implemented possibility for establishing the connection between the connecting rod and the planet wheel.

The cylinder arrangement of some embodiments has at least one inlet valve for feeding a gas mixture, in particular a fuel-air mixture, into the combustion chamber and at least one exhaust valve for letting a gas mixture out of the combustion chamber. Corresponding valves can be controlled easily by valve trains and thus represent an efficient way of ensuring the supply of a fuel-air mixture to the combustion chamber. It is also conceivable to provide for the valves to open several times within a cycle. However, embodiments having plural inlet and exhaust valves are likewise conceivable.

In one embodiment, the annulus can be rotated through a defined angular position. As a result, the planet wheel likewise rotates, thereby changing the alignment of the eccentricity with which the connecting element of the connecting rod is secured on the planet wheel. Consequently, the dead centers are slightly modified, and this has effects on the compression ratio in the combustion chamber and on the control of the valves, in particular the inlet valve. In this way, the timings of the valves can be adjusted by a slight rotation of the annulus through a defined angular position. Appropriate arrangement of the scavenging ports enables partial masking of the scavenging ports by rotation of the annulus, thereby influencing the scavenging of the combustion chamber.

The rotation of the annulus can be effected by an external thread arranged on the outside of the annulus. The annulus can be rotated by a gearwheel that engages in this external thread.

In some embodiments, the geometrical dimensions of the annulus and the planet wheel and the distance between the eccentrically arranged connecting elements of the connecting rod and the geometrical center of the planet wheel are chosen so that the ratio between the distance between the first top dead center and the first bottom dead center and the distance between the first top dead center and the second bottom dead center is between 0.7 and 0.85. The distance between the eccentric connecting element and the geometrical center of the planet wheel is defined by the distance between the connecting point of the connecting element on the planet wheel and the geometrical center of the planet wheel. This ratio ensures particularly advantageous operation of the combustion machine in respect of clean combustion and power development.

The combustion machine has at least one cylinder arrangement as described herein. The number of cylinders is preferably a multiple of 3. A combustion machine according to this disclosure can be in the form of different designs and can thus have different geometrical arrangements of the individual cylinder arrangements. Thus, it can be an in-line engine, V engine, W engine or horizontally opposed engine, for example.

It should be noted that the method features disclosed in the context of the application likewise apply to the device according to the invention and vice versa.

Embodiments and advantageous aspects of the invention are explained in greater detail below with reference to the attached figures.

FIG. *4a* is a detail view of the piston arrangement where the piston is in the second bottom dead center.

FIG. *4b* is a detail view of the cylinder where the piston is in the second bottom dead center.

Figure 1:
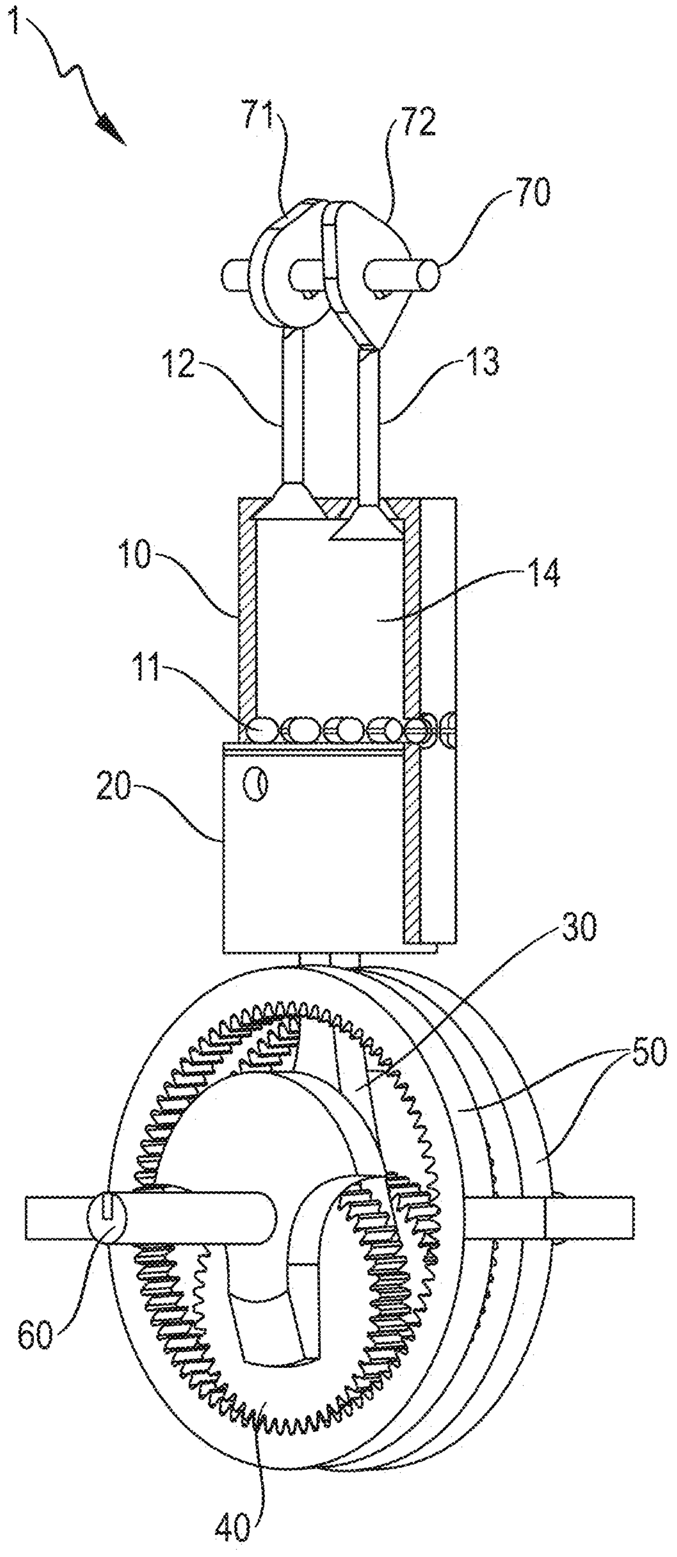
FIG. 1 is a perspective view of a piston arrangement according to an embodiment of the invention.

FIG. *5a* is a detail view of the piston arrangement 1 of FIG. 1 where the piston is in the first bottom dead center.

FIG. *5b* is a detail view of the cylinder 10 where the piston 20 is in the first bottom dead center.

Figure 6:
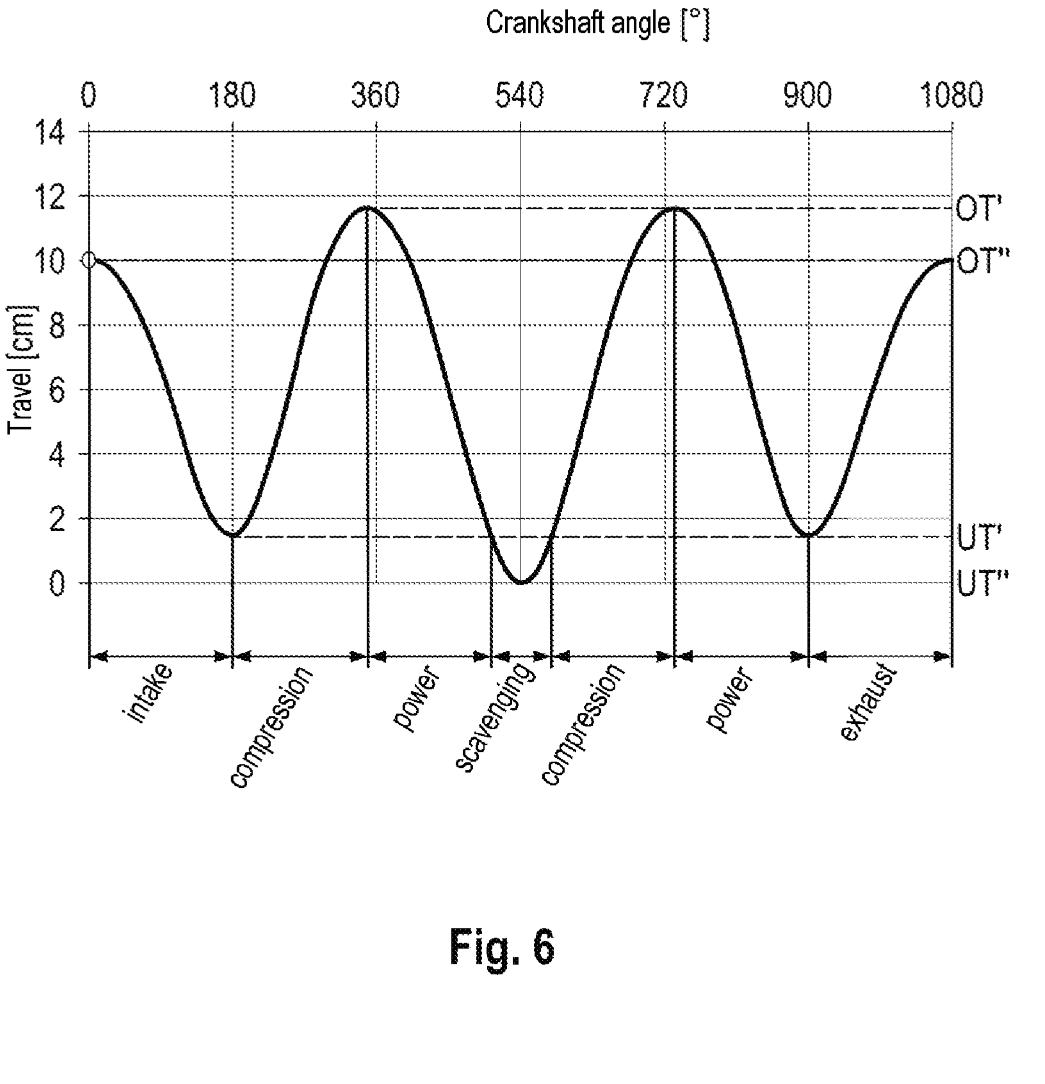

FIG. 6 illustrates the motion profile of a piston in a piston arrangement plotted against the crank angle.

Figure 7:
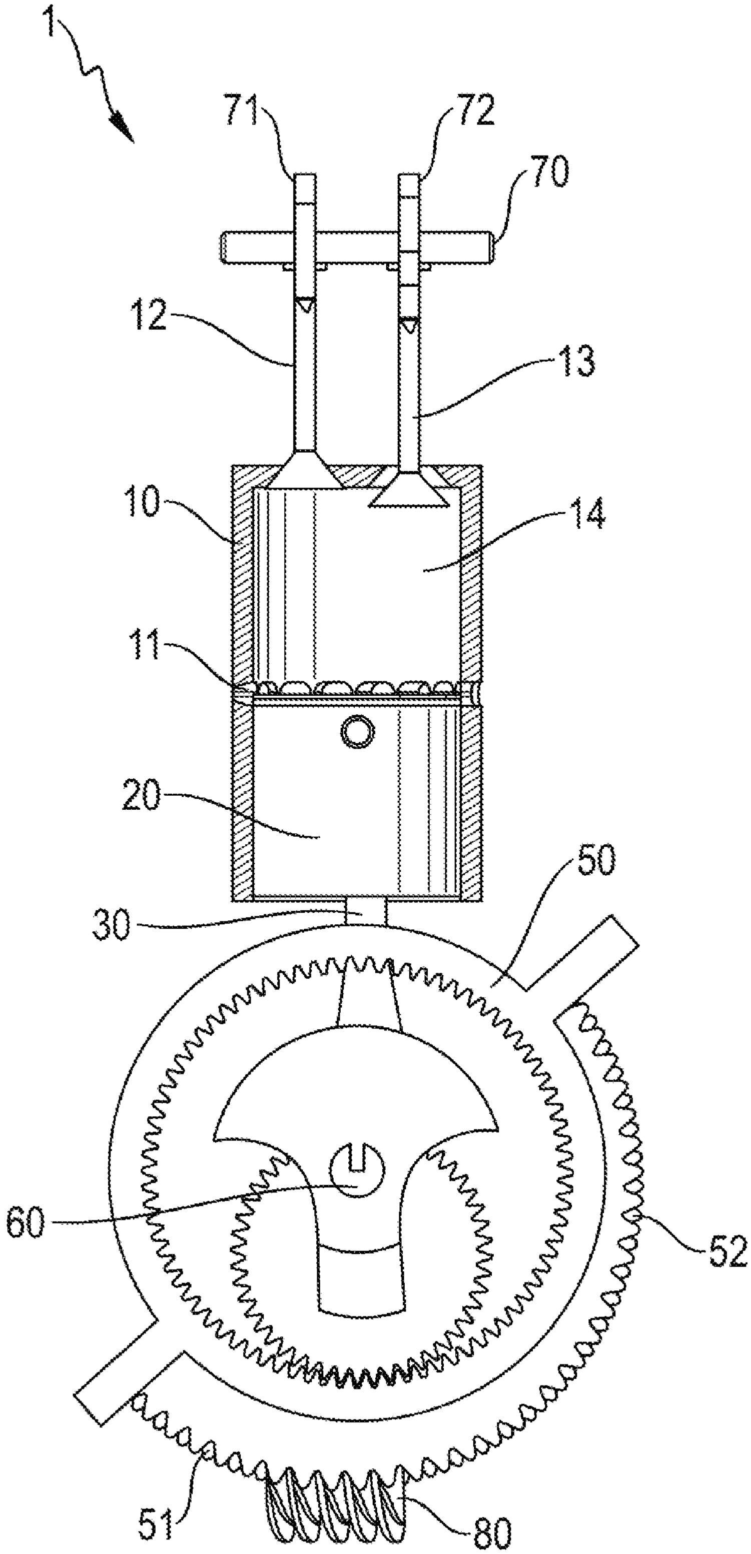

FIG. 7 is a schematic view of a piston arrangement according to a second embodiment with variable timings of the inlet valve.

DETAILED DESCRIPTION

FIG. 1 is a perspective view of a piston arrangement 1 that has a cylinder 10, in which a piston 20 performs a linear motion. The cylinder 10 is cut away for clarity. The cylinder 10 and the piston 20 enclose a combustion chamber 14 with a volume that changes as a function of the movement of the piston 20 in the cylinder 10. An inlet valve 12 and an exhaust valve 13 are arranged at one end of the cylinder 10, i.e. the top, to pass a gas mixture into the combustion chamber 14 and to discharge the gas mixture from the combustion chamber 14. The valves are controlled by a camshaft 70 and by inlet cams 71 and exhaust cams 72 secured thereon. Embodiments having plural inlet valves 12 and exhaust valves 13 controlled by plural camshafts 70 are conceivable. The cylinder 10 has, at a defined height, radial scavenging ports 11, by means of which the combustion chamber can be scavenged, given an appropriate position of the piston 20.

The piston 20 is connected by a connecting rod 30 to two planet wheels 40 that rotate in an annulus 50. It is possible to provide just one planet wheel 40 and one annulus 50. For the sake of simplicity, only one planet wheel 40 and one annulus 50 are discussed below since the motion of the two planet wheels 40 takes place synchronously. A crankshaft 60 is connected to the planet wheel 40. The crankshaft 60 makes available the power of the engine and connects different piston arrangements 1 to one another. The connecting rod 30 is connected eccentrically to the planet wheel 40, i.e. not in the geometrical center of the planet wheel 40, and this will be explained in greater detail with reference to FIG. 2.

Figure 2:
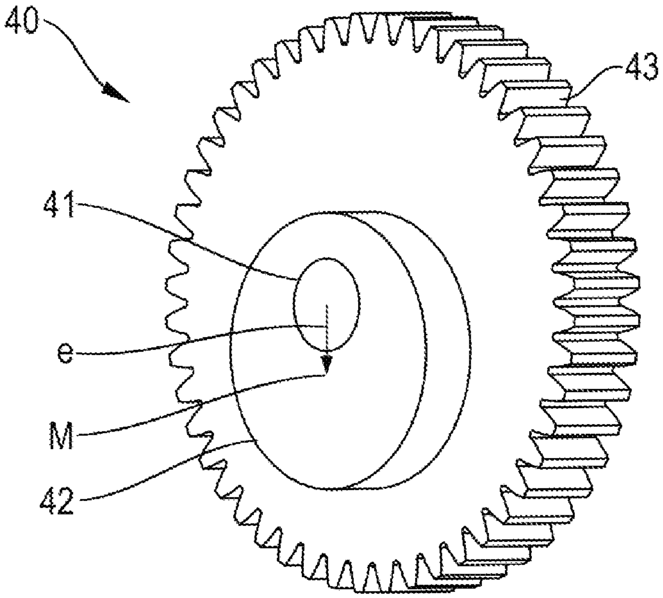
FIG. 2 is a detail view of a planet wheel of a piston arrangement.

FIG. 2 is a detail view of the planet wheel 40 that can be used in the embodiment of the piston arrangement 1 of FIG. 1. The planet wheel 40 has external toothing 43 that engages with the toothing of the annulus 50. The connection of the connecting rod 30 to the planet wheel 40 is accomplished via a cylindrical connecting element 42 arranged on the side face of the planet wheel 40. The socket 41 for the crankshaft 60 is arranged in the geometrical center of the planet wheel 40.

The geometrical center M of the cylindrical connecting element 42 does not coincide with the geometrical center K of the planet wheel 40. Thus, the connecting element 42 is arranged eccentrically on the side face of the planet wheel 40. The eccentricity e, that is the distance between the geometrical center M of the connecting element and the geometrical center K of the planet wheel 40, represents an important parameter for the piston motion, as explained in greater detail with reference to FIG. 3.

Figure 3:
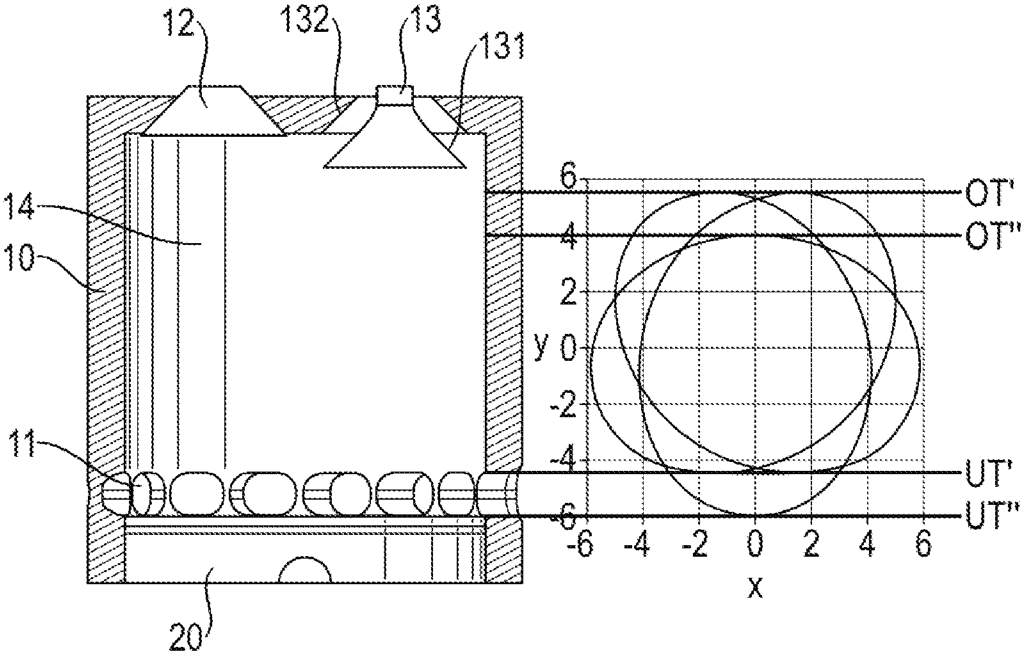
FIG. 3 is a cross section of a cylinder and a motion profile of the central point of the connecting element for fastening the connecting rod on the planet wheel.

FIG. 3 shows a cross section of the cylinder 10 and the motion profile of the geometrical center M of the connecting element 42. The motion profile of a point on the piston corresponds to the motion profile of the geometrical center M of the connecting element 42 in the y direction of the diagram. The cylinder 10 corresponds to the cylinder 10 of FIG. 1. Due to the eccentricity e explained with reference to FIG. 2, the linearly oscillating axial motion of the piston 20 within the cylinder 10 does not always take place between the same two end points, as in the prior art. These are referred to conventionally as top and bottom dead center (OT, UT) and each marks the point of reversal of the piston 20 during the axial motion. Due to the eccentricity e in the piston arrangement 1 according to the invention, the motion takes place between two upper and two lower dead centers. As explained in greater detail below with reference to FIG. 6, a working cycle (overall cycle comprising two operating cycles/power strokes) of the piston arrangement of the invention comprises three revolutions of the crankshaft 60. This means that the planet wheel 40 also rotates three times within the annulus 50. Owing to the eccentricity e, the geometrical center M of the connecting element 42 does not travel on a circular path during a revolution. However, after three revolutions of the crankshaft 60, the geometrical center M is once more at the same point. The motion profile of the geometrical center M of the connecting element 42 is depicted on the right-hand side of FIG. 3, where the motion profile of an upper point of the piston 20 corresponds to the motion profile of the geometrical center M of the connecting element 42 and thus the diagram can be applied in the y direction to an upper point of the piston 20.

This hypocycloidal curve has three maxima, which can be interpreted as top dead centers, and three minima, which can be interpreted as bottom dead centers. Two maxima are higher than the third maximum, and one minimum is lower than the two other minima. As a result, therefore, the two higher maxima form the first top dead center OT', and the lower maximum forms the second top dead center OT". Similarly, the two higher minima form the first bottom dead center UT', and the one lower minimum (as it were the global minimum of the motion curve) forms the second bottom dead center UT".

Owing to the conversion of the hypocycloidal motion profile of the geometrical center M of the connecting element 42 to a linear axial alternating motion of the piston 20, the piston moves between the second bottom dead center UT" and the first top dead center OT' during a working cycle, wherein the first top dead center OT' is reached twice and the second top dead center OT" once. Similarly, the first bottom dead center UT' is reached twice and the second bottom dead center UT" once. The scavenging ports 11 are arranged in the cylinder 10 in such a way that they are only exposed by the piston 20 as the latter passes through the second bottom dead center UT". The greater the eccentricity e chosen, the more the hypocycloidal motion profile of the geometrical center M of the connecting element 42 deviates from a circular path and, consequently, the greater is the difference between the respective first and second dead centers. The aim is to achieve as uniform as possible compression for both operating cycles.

Figure 4A:
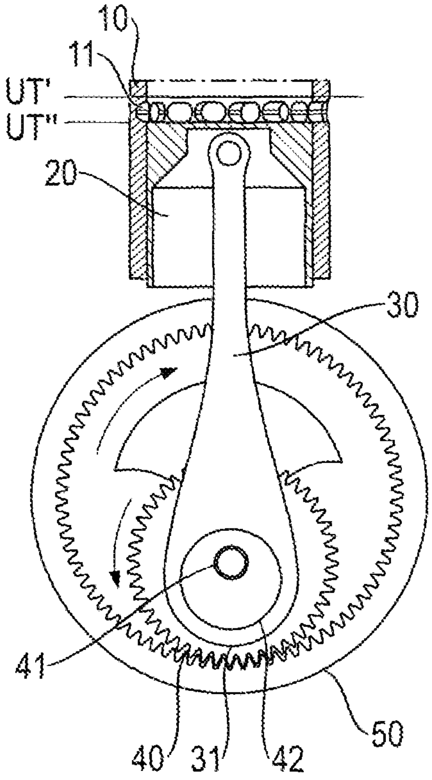
Figure 5A:
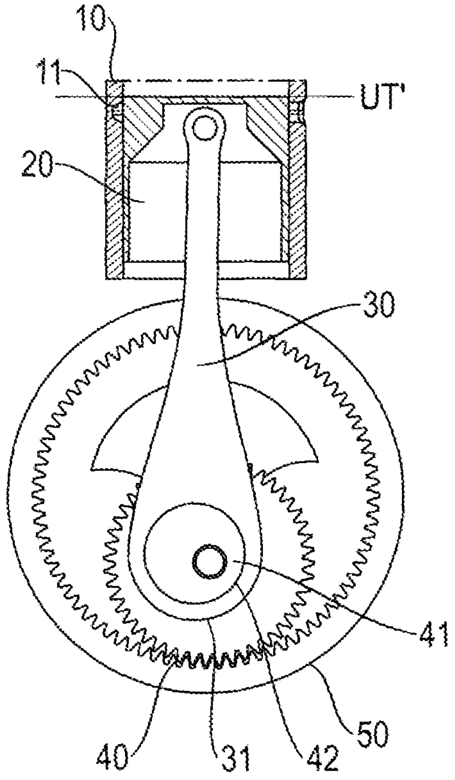
Figure 4B:
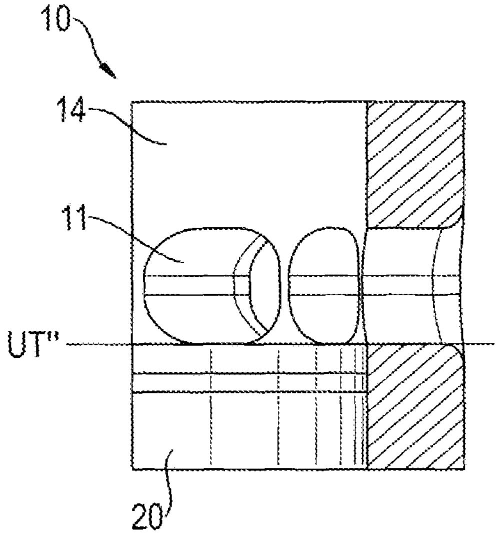

The formation of different top and bottom dead centers is further shown in greater detail in FIGS. 4*a*, 4*b* and 5*a* and 5*b*. FIGS. 4*a* and 5*a* show the piston arrangement 1 in different positions of the working cycle. In FIG. 4*a*, the planet wheel 40 is in the position farthest away from the cylinder 10 within the annulus 50. At the same time, the planet wheel 40 is oriented in such a way that the eccentricity e points down in the plane of the drawing, i.e. the connecting element 42 is farther away from the cylinder 10 than the geometrical center of the planet wheel 40. Thus, the piston 20 is at the second bottom dead center UT", i.e. the global minimum in the motion profile from FIG. 3. As a result, as illustrated schematically in FIG. 4*b*, the radial scavenging ports 11 in the cylinder 10, which is here illustrated in a cutaway view, are exposed by the piston 20.

Figure 5B:
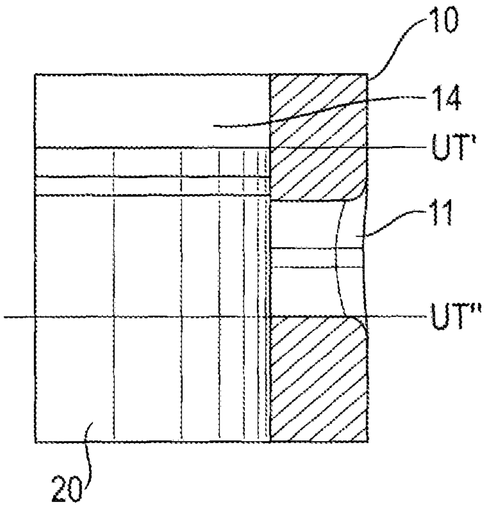

In FIG. 5*a*, the planet wheel 40 is again at the point farthest away from the cylinder 10 in the annulus 50, more specifically precisely one revolution of the planet wheel 40 later in the annulus 50. However, the geometrical center M of the connecting element 42 is not at the same point again after one revolution of the planet wheel 40 in the annulus 50, but has shifted upward to the left in the plane of the drawing in FIG. 5*a*. As a result, the piston 20 is at the first bottom dead center UT' in the cylinder 10, where it covers the scavenging ports 11 and thus does not allow escape of the gas mixture from the combustion chamber 14 through the scavenging ports 11, as illustrated in FIG. 5*b*.

FIG. 6 illustrates the motion profile of the piston 20 in the cylinder 10 of a piston arrangement 1. By means of FIG. 6, the working cycle of the piston arrangement 1 according to the invention and thus the method according to the invention is described in greater detail in conjunction with FIG. 1.

The overall cycle comprises a crankshaft rotation of 1080°, which corresponds to 3 full crankshaft revolutions. It is divided into a total of six strokes, which each comprise 180°, i.e. half a crankshaft revolution. The diagram shows the angle of the crankshaft 60 on the x axis, i.e. the crankshaft rotation, and the travel of the piston 20 within the cylinder 10 on the y axis. The specific numerical values will only be mentioned by way of example at this point.

In the initial position, the piston 20 is at the second top dead center OT". From there, it moves toward the first bottom dead center UT' in the first stroke. During this movement, the inlet cam 71 on the camshaft 70 (see FIG. 1) opens the inlet valve 12, and an air-fuel mixture enters the combustion chamber 14. In an alternate embodiment, it is possible only for fresh air to enter the combustion chamber through the inlet valve and to mix with an injected fuel to form a fuel-air mixture in the subsequent compression stroke.

After reaching the first bottom dead center UT', the volume of the combustion chamber 14 is reduced again by the motion of the piston 20 toward the first top dead center OT'. During this process, the gas mixture in the combustion chamber 14 is compressed, and thus this stroke can be described as a compression stroke. During this stroke, the inlet valve 12 is closed again to prevent the gas mixture from escaping. The first two strokes are thus known from a four-stroke engine, but, in contrast to the four-stroke engine, the piston motion comprises two different top dead centers.

The gas mixture is ignited when or shortly before the first top dead center OT' is reached. For this purpose, a spark plug like that in conventional combustion machines is used in the case of spark-ignition engines while, in the case of diesel engines, the compression is so great that the gas mixture ignites spontaneously due to the high pressure and the associated increase in temperature. The ignition of the gas mixture greatly increases the pressure in the combustion chamber 14 so that the piston 20 accelerates from the first top dead center OT' to the second bottom dead center UT" during the movement in the third stroke. The power can thus be transmitted to the crankshaft 60 via the connecting rod 30.

Once the piston 20 reaches the first bottom dead center UT', it exposes the scavenging ports 11 arranged radially in the cylinder 10 so that the combustion chamber 14 is scavenged. During the passage through the second bottom dead center UT" of the piston 20, the scavenging ports 11 are opened until, in the fourth stroke, the piston 20 once again passes the first bottom dead center UT' and the scavenging ports 11. During scavenging that takes place at the transition between two strokes, it is possible but not necessary that the inlet valve 12 will open and hence that fresh gas mixture will flow into the combustion chamber from the cylinder top if the pressure in the combustion chamber 14 is lower than the pressure at which the fresh gas mixture flows into the combustion chamber 14. The exhaust valve 13 preferably opens at least partially during the scavenging process (see FIG. 3), thus enabling the gas mixture to escape at least partially via the exhaust valve during the scavenging process. The scavenging process preferably takes place so that a fresh gas mixture flows in through scavenging ports 11 in the bottom of the combustion chamber 14 while the gas mixture in the combustion chamber 14 is expelled through the exhaust valve 13. The use of plural exhaust valves 13, with only some of them being used for scavenging, is conceivable, as are embodiments in which both the outflow and the inflow of the gas mixture during the scavenging process are at least partially achieved via correspondingly arranged scavenging ports 11.

As soon as the piston 20 closes the scavenging ports 11 in its movement back in the direction of the first top dead center OT' during the fourth stroke, scavenging is complete (with the optionally opened exhaust valve 13 also closing) and the remaining gas mixture in the combustion chamber 14 is compressed again and then ignited again, that is for a second time within a working cycle. During the compression process, the optionally opening valves are closed again. The fourth and the fifth stroke thus correspond very largely to the strokes known from a two-stroke engine.

On account of the repeated, i.e. second, ignition of the gas mixture, there is a second power output to the crankshaft 60 in the fifth stroke within the working cycle so that the piston 20 gets only as far as the first bottom dead center OT'. In this second combustion stroke (power output), the remaining combustion constituents in the gas mixture are burned fully, thereby achieving particularly clean and complete combustion.

After the passage through the first bottom dead center UT', a valve disk 131 of the exhaust valve 13 is raised from its valve seat 132, and the burned gas mixture that has remained in the combustion chamber 14 is expelled through the exhaust valve 13. For this purpose, the exhaust cam 72 (see FIG. 1) in the embodiment shown has two lobes to open the exhaust valve 13 during the scavenging process and the exhaust stroke (stroke 6). After the second top dead center OTE" has been reached, one working cycle has been completed, and the strokes begin once again from the beginning. Of course, embodiments of the invention with independently controllable valve trains and embodiments without a camshaft are also conceivable to provide variable timing of the opening and closing times of the inlet valve 12 and of the exhaust valve 13.

Owing to the fact that two combustions and thus power outputs take place during one working cycle, i.e. the overall cycle of 6 strokes, the engine is a 3-stroke engine, with two different 3-stroke sequences being carried out alternately. It would therefore also be possible to refer to a two-times-three-stroke engine. Here, both compression strokes take place between the first bottom dead center UT' and the first top dead center OT', thus making it possible to ensure a constant compression ratio for the respective combustions that follow.

FIG. 7 essentially shows the crankshaft arrangement of FIG. 1, and therefore only the differences will be explored at this point. In contrast to the embodiment of FIG. 1, the embodiment of FIG. 7 also has an external thread 51 that extends over half the circumference on the outside of the annulus 50.

By rotating the gearwheel 80, the annulus 50 can be rotated around the crankshaft 60. As a result, the planet wheel 40 likewise rotates so that the eccentricity with which the connecting element 42 connects the connecting rod 30 and the planet wheel 40 is shifted slightly. Consequently, there is also a shift in the dead centers since, owing to the shift in the eccentricity, the extremes of the piston motion are no longer identical. On the one hand, this has the effect that the volume that is available within the combustion chamber 14 for compression, and thus the compression ratio of the gas mixture in the combustion chamber 14, is modified and also the opening and closing times of the inlet valve, are modified, and control of these times can thus be achieved by rotating the annulus 50.

The invention claimed is:

1. A method for operating a combustion machine, where a working cycle comprises three revolutions of a crankshaft (60) of the combustion machine, and a piston (20) of the combustion machine reaches a first top dead center (OT') twice and a second top dead center (OT") once and reaches a first bottom dead center (UT') twice and a second bottom dead center (UT") once during a working cycle, the first top dead center (OT') and the first bottom dead center (UT') are farther from the crankshaft (60) than the second top dead center (OT") and the second bottom dead center (UT"), respectively, the method comprising:

feeding a fuel mixture into a combustion chamber (14) of the cylinder (10) during a movement of the piston (20) from the second top dead center (OT") to the first bottom dead center (UT');

compressing the air-fuel mixture in the combustion chamber (14) of the cylinder (10) during a movement of the piston (20) from the first bottom dead center (UT') to the first top dead center (OT');

burning the air-fuel mixture during a movement of the piston (20) from the first top dead center (OT') to the second bottom dead center (UT");

compressing a gas mixture located in the combustion chamber (14) during a movement of the piston (20) from the second bottom dead center (UT") to the first top dead center (OT');

burning the gas mixture during a movement of the piston (20) from the first top dead center (OT') to the first bottom dead center (UT');

expelling the gas mixture located in the combustion chamber (14) during a movement of the piston (20) from the first bottom dead center (UT') to the second top dead center (OT"); and scavenging at least some of the gas mixture from the combustion chamber (14) as the piston (20) passes through the second bottom dead center (UT").

2. A combustion machine having the cylinder arrangement (1) of claim 1.

3. The method of claim 1, further comprising injecting a fuel mixture into the combustion chamber (14) during compression that occurs during the movement of the piston (20) from the second bottom dead center (UT") to the first top dead center (OT') while scavenging after the piston (20) passes through the second bottom dead center (UT").

4. The method of claim 1, wherein an exhaust valve (13) is opened during passage of the piston (20) through the second bottom dead center (UT").

5. A cylinder arrangement (1) of a combustion machine, comprising:

a piston (20) that moves backward and forward in translation in a cylinder (10), the piston (20) and the cylinder (10) delimiting a combustion chamber (14);

a connecting rod (30) connecting the piston (20) to a planet wheel (40) by means of a connecting element (42), the connecting element (42) being arranged eccentrically on the planet wheel (40), the planet wheel (40) engaging an annulus (50) and rotates in the annulus (50), and the planet wheel (40) further being connected to a crankshaft (60), wherein:

dimensioning of the planet wheel (40) and the eccentric arrangement of the connecting element (42) are designed so that, in three revolutions of the planet wheel (40) in the annulus (50), the piston (20) reaches a first top dead center (OT') twice and a second top dead center (OT") once and reaches a first bottom dead center (UT') twice and a second bottom dead center (UT") once, the first top dead center (OT') and the first bottom dead center (UT') are farther from an axis of the annulus than the second top dead center (OT") and the second bottom dead center (UT").

6. The cylinder arrangement (1) of claim 5, wherein the cylinder (10) has at least one scavenging port (11) between the first bottom dead center (UT') and the second bottom dead center (UT"), the scavenging port accommodating a discharge of a gas mixture from the combustion chamber (14).

7. The cylinder arrangement (1) of claim 5, wherein the connecting element (42) between the connecting rod (30) and the planet wheel (40) is formed by an eccentrically arranged cylindrical element that is surrounded by a connecting rod eye (31) arranged at an end of the connecting rod (30).

8. The cylinder arrangement (1) of claim 5, wherein the cylinder arrangement (1) has at least one inlet valve (12) for feeding a fuel-air mixture into the combustion chamber (14) and one exhaust valve (13) for letting a gas mixture out of the combustion chamber (14).

9. The cylinder arrangement (1) of claim 5, wherein the annulus (50) is rotatable around the crankshaft (60).

10. The cylinder arrangement (1) of claim 9, wherein an external thread (51) is arranged on an outside of the annulus (50) to rotate the annulus (50) around the crankshaft (60).

* * * * *